UNITED STATES PATENT OFFICE.

L. OTTO P. MEYER, OF NEWTOWN, CONNECTICUT.

IMPROVEMENT IN PROCESSES OF PRODUCING VULCANIZED SOFT INDIA-RUBBER GOODS.

Specification forming part of Letters Patent No. 153,447, dated July 28, 1874; application filed April 25, 1874.

CASE A.

*To all whom it may concern:*

Be it known that I, L. OTTO P. MEYER, of Newtown, county of Fairfield and State of Connecticut, have invented an Improved Process for Producing what is known as Vulcanized, Soft, Elastic, or Compressible India-Rubber Goods with a glossy surface or surfaces, of which the following is a specification:

Prior to my said invention it was considered impracticable to produce what is known as soft, elastic, or compressible vulcanized india-rubber goods with a glossy surface, except by coating the surface with linseed-oil or varnish before vulcanizing in dry heat, such as in the manufacture of shoes, coats, blankets, and such like goods, and except also by painting or varnishing the surface after vulcanization. The surfaces so rendered glossy were not suitable for many purposes in the arts.

It has heretofore been attempted to produce the required result as in the vulcanization of hard rubber or vulcanite—that is, by covering or plating the surfaces with metallic sheets on forms—but without success, as it was found that after vulcanization the surfaces would be invariably injured in the attempt to remove the metallic covering. To prevent such injurious adhesion it was found necessary to rub the surfaces with soap-stone, or other powder, to prevent the surfaces from adhering, but in such cases the required glossy surface could not be obtained.

My said invention consists in the use of paraffine, preparatory to, and as a means of, effecting such a contact of the surface of the plastic compound with the metallic sheets or forms as to effectually produce a glossy surface by the after vulcanization, which will not be injured in gloss or color by the after separation from the metallic sheets or forms.

I will describe the manner in which I have successfully produced my new manufacture.

I prefer to use for the metallic sheets tinfoil of about one-hundredth part of an inch in thickness, although the same result in kind can be obtained with thicker sheets, and even with thick metallic plates or forms. The metallic sheets are placed on a platform heated somewhat above the melting-point of paraffine. And after the metallic surface has been properly cleaned it is to be rubbed with a rag dipped in paraffine, and a little French chalk may be mixed with the paraffine before rubbing on, or the French chalk may be brushed over the coated metallic sheets, if the articles to be produced are intended to be of some light color. Lamp-black is to be taken instead of French chalk for black-colored articles. The metallic sheets so coated are laid aside to cool, and previously to rolling them onto the compound in the green state I prefer to rub a little lard-oil on the surface which is to be plated, and then the contact of the surfaces is effected by the pressure of rollers, as heretofore practiced in covering the hard compound for the production of vulcanite, but with the difference that this process of plating may be done at common temperature. Instead of applying French chalk or lamp-black to the coating of paraffine, it may be applied to the compound, or it may be entirely dispensed with. And so can the rubbing of the surface of the compound with lard-oil be dispensed with. Said plastic compound, after being plated by my new process, may be shaped into various forms by embossed dies, in a manner as usual for embossing hard-rubber compound. By the mode of treatment above specified, what is known as the soft elastic and compressible compound of india-rubber and sulphur, as distinguished from hard rubber or vulcanite, can be produced with a beautiful glossy surface, and, when vulcanized, can be readily separated from the covering metallic sheets or forms without injury to the gloss or color of the surface.

What I claim as my invention, and desire to secure by Letters Patent, is—

In the process of vulcanization for the production of what is known as soft, elastic, and compressible vulcanized india-rubber, as distinguished from hard rubber or vulcanite, the use of paraffine in covering the plastic compound with sheets or forms of metal preparatory to vulcanization, substantially as and for the purpose specified.

L. OTTO P. MEYER.

Witnesses:
HENRY SANFORD,
ELI C. BARNUM.